US010913605B2

(12) United States Patent
O'Herlihy et al.

(10) Patent No.: US 10,913,605 B2
(45) Date of Patent: Feb. 9, 2021

(54) WAREHOUSE MANAGEMENT SYSTEM

(71) Applicant: Everseen Limited, Blackpool (IE)

(72) Inventors: Alan O'Herlihy, Glenville (IE); Sergiu Alexandru Vlad, Timis (RO); Viorel Baicu, Timis (RO)

(73) Assignee: Everseen Limited, Blackpool (IE)

( * ) Notice: Subject to any disclaimer, the term of this patent is extended or adjusted under 35 U.S.C. 154(b) by 281 days.

(21) Appl. No.: 16/254,154

(22) Filed: Jan. 22, 2019

(65) Prior Publication Data

US 2020/0231382 A1    Jul. 23, 2020

(51) Int. Cl.
| | |
|---|---|
| *G06K 9/00* | (2006.01) |
| *B65G 1/137* | (2006.01) |
| *G06F 16/583* | (2019.01) |
| *G06F 21/32* | (2013.01) |
| *G06Q 50/28* | (2012.01) |
| *G10L 15/18* | (2013.01) |
| *G10L 15/22* | (2006.01) |
| *G10L 13/00* | (2006.01) |

(52) U.S. Cl.
CPC ....... *B65G 1/1373* (2013.01); *G06F 16/5854* (2019.01); *G06F 21/32* (2013.01); *G06K 9/00288* (2013.01); *G06Q 50/28* (2013.01); *G10L 13/00* (2013.01); *G10L 15/18* (2013.01); *G10L 15/22* (2013.01); *B65G 2203/041* (2013.01); *G10L 2015/223* (2013.01)

(58) Field of Classification Search
CPC . B65G 1/1373; B65G 2203/041; G10L 13/00; G10L 15/18; G10L 15/22; G10L 2015/223; G06F 16/5854; G06F 21/32; G06K 9/00288; G06K 9/00; G06K 17/0022; G06K 7/0008; G06K 9/00771; G06K 9/00671; G06Q 50/28; G06Q 10/087; G06Q 10/08; G06Q 30/0639; H04W 84/12; H04W 40/02; H04L 5/1484
USPC .......................... 382/103; 709/225; 713/186
See application file for complete search history.

(56) References Cited

U.S. PATENT DOCUMENTS

| 7,735,732 B2 | 6/2010 | Linton et al. |
|---|---|---|
| 7,780,081 B1 | 8/2010 | Liang |
| 9,996,818 B1 | 6/2018 | Ren et al. |
| 2004/0249497 A1 | 12/2004 | Saigh et al. |
| 2007/0198848 A1* | 8/2007 | Bjorn ...................... G06F 21/35 713/186 |

(Continued)

OTHER PUBLICATIONS

"Retail Grocery Store Logistics and Inventory Management" by Jim Davis et al. http://www.s2ct.tech/whitepaper-grocery-inventory-management.

*Primary Examiner* — Charlotte M Baker
(74) *Attorney, Agent, or Firm* — Young Basile Hanlon & MacFarlane, P.C.

(57) ABSTRACT

A warehouse management system is configured to include a biometric processing engine to authenticate a user though facial recognition of the user, a natural language processing engine to enables touchless interaction of the user with the system, a voice synthesizer to execute synthesized voice interrogative prompts and respond to responses received from the user, and a quantity detection engine for capturing images of transaction articles and feeding to an artificial image quantization engine (AIQE) for extracting quantities from the captured images and to an artificial image self-learning engine (AISLE) for self-learning of the AIQE.

18 Claims, 5 Drawing Sheets

(56) References Cited

U.S. PATENT DOCUMENTS

| | | | |
|---|---|---|---|
| 2009/0164631 A1* | 6/2009 | Wooley | G07F 9/026 |
| | | | 709/225 |
| 2019/0043615 A1* | 2/2019 | Subbarao | G16H 20/13 |
| 2019/0213212 A1* | 7/2019 | Adato | G06F 16/235 |
| 2020/0005385 A1* | 1/2020 | Stout | G06Q 30/0633 |

* cited by examiner

WAREHOUSE MANAGEMENT SYSTEM

TECHNICAL FIELD

The present disclosure relates to generally managing warehouse with the aid of programmable computers and more particularly to systems and methods for automated receiving, sorting, marking, tracking, or delivery of transaction articles from and to a warehouse.

BACKGROUND

Presently, the best-known automated warehouse management systems are generally based on a coded pattern consisting of vertical bars known as a bar code pattern. This pattern is imprinted somewhere on the controlled articles or its container. Each bar code pattern identifies a unique item. Point-of-sale control is implemented with laser beam scanners which interface with a computer system to interpret the code pattern. Often these known systems are used to monitor or control massive numbers of relatively inexpensive, consumable products with a single code to identify each item. This results in a system which has a response time which can be significantly poorer than desired and errors by the human operator limit data integrity.

Most other existing warehouse management methods involve direct (or actual) count of individual items. The resulting data may be further processed by computer. If computer processing is desired, the hand-counted information must be manually input into the computer. In retailing of durable goods, this category includes products sold in large numbers (10-20 million annually) with an immense economic impact to the warehouse owner. Currently, this market incurs a large expense to control warehouse and protect investments. These types of products are relatively high cost, major purchase items (with individual serial numbers) that have extended floor time at the dealer's location and usually require financing of the dealer's warehouse.

Each article must be identified and tracked from manufacturer to distributer and into the dealer network until the time of sale. The procedure of inspection and identification by serial number is a labor-intensive, hands-on technique that is expensive for several reasons. Further, unsold articles in warehouses can accumulate storage fees and create a backlog of non-current models.

Control at a dealer location is even more difficult. Floor check fees based on article count make it difficult to count the articles more than once a month in the warehouse. Thus, the system with infrequent checking suffers from errors and associated costs, but more frequent checking inserts errors made in the course of an article more frequently and imposes other expenses.

As a result, there is little effective correlation between sales, production, shipping, warehousing and the like, based on up-to-date data. Hence, the problems of left-over models, stock in the wrong warehouse and the like are, to a great extent, built into the system.

In view of the above, there is clearly a need to provide a warehouse control and maintenance system which eliminates or reduces these problems in a cost-effective fashion.

SUMMARY

This summary is provided to introduce concepts related to manage warehouse with the aid of automated mechanisms of receiving, sorting, marking, tracking, or delivery of transaction articles from and to a warehouse. The concepts are further described below in the detailed description. This summary is not intended to identify key features or essential features of the claimed subject matter, nor is it intended to be used to limit the scope of the claimed subject matter.

In one implementation, the present disclosure relates to a warehouse management system. The system includes a non-transitory storage device having embodied therein one or more routines operable to manage warehouse check-in and check-out system; and one or more processors coupled to the non-transitory storage device and operable to execute one or more routines. The one or more routines include a biometric processing engine, which when executed by the one or more processors, authenticates a user though facial recognition of the user; a natural language processing engine, which when executed by the one or more processors, enables touchless interaction of the user with the system; a voice synthesizer engine, which when executed by the one or more processors, executes voice interrogative prompts synthesized and responds to responses received from the user; and a quantity detection engine, which when executed by the one or more processors, capture images of transaction articles and feeds to an artificial image quantization engine (AIQE) and an artificial image self-learning engine (AISLE), wherein the AIQE is for extracting quantities from the captured images and the AISLE is for self-learning of the AIQE.

In another implementation, the present disclosure further relates to a method for warehouse management. The method includes authenticating a user though facial recognition of the user; facilitating touchless interaction of the user with the system; executing voice interrogative prompts synthesized and responding to responses received from the user during interaction; and capturing images of transaction articles and feeding to an artificial image quantization engine (AIQE) and an artificial image self-learning engine (AISLE), wherein the AIQE is for extracting quantities from the captured images and the AISLE is for self-learning of the AIQE.

In yet another implementation, the present disclosure relates to a non-transitory computer-readable medium implementing the subject matter includes instructions executable by a processing resource. The instructions are executed to authenticate a user though facial recognition of the user; facilitate touchless interaction of the user with the system; execute voice interrogative prompts synthesized and respond to responses received from the user during interaction; and capture images of transaction articles and feed to an artificial image quantization engine (AIQE) and an artificial image self-learning engine (AISLE), wherein the AIQE is for extracting quantities from the captured images and the AISLE is for self-learning of the AIQE.

In an aspect, the AIQE is adapted to receive the captured images of the transaction articles from the quantity detection engine; perform composition classification by splitting the captured images by mask division so as to remove empty slots from the captured images; extract key features of the transaction articles from the classified captured images; batch classification of the transaction articles based on the extracted key features; label of the transaction articles based on the batch classification; and ascertain the quantity of the transaction articles based on the labelling of the transaction articles.

In an aspect, the AISLE is adapted to receive the captured images of the transaction articles from the quantity detection engine; perform composition classification by splitting the captured images by mask division so as to remove empty slots from the captured images; extract key features of the transaction articles from the classified captured images; receive a user input related to quantity of the transaction articles; label the transaction articles based on the user input; and ascertain the quantity of the transaction articles based on the labelling of the transaction articles.

In an aspect, based on receipt of the user-input related to the quantity of the transaction articles, the AISLE is to retrain dataset available with a training server coupled to the system by sending the classified images to the training server; training the training server with a new data set to update a trained model; and pushing the trained model to e-receiver application associated with the system.

In an aspect, the biometric processing engine authenticates the user by continuously looking for faces in associated database until some relevant faces are found; extracting the templates, representing facial features, from all the found relevant faces; matching the one by one the extracted templates against the relevant faces from the associated database; and authenticating the user based on the matching.

In an aspect, after the ascertainment of the quantity of the transaction articles, the system is adapted to shipment image acquisition after ascertainment of the quantity of the transaction articles; and to publish the shipment image.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein:

DETAILED DESCRIPTION

A few aspects of the present disclosure are explained in detail below with reference to the various figures. Example implementations are described to illustrate the disclosed subject matter, not to limit its scope, which is defined by the claims. Those of ordinary skill in the art will recognize a number of equivalent variations of the various features provided in the description that follows.

The primary aim of the present disclosure is to manage warehouse with the aid of automated mechanisms of ease the process of receiving, sorting, marking, tracking, or delivery of transaction articles from and to a warehouse. The present disclosure proposes methods and systems for providing complete automated and voice-based interactions with users of the systems. The methods and systems achieve the primary of the present disclosure by authenticating a user though facial recognition of the user; facilitating touchless interaction of the user with the system; executing voice interrogative prompts synthesized and responding to responses received from the user during interaction; and capturing images of transaction articles and feeding them to an artificial image quantization engine (AIQE) and an artificial image self-learning engine (AISLE). The AIQE is adapted for extracting quantities from the captured images while the AISLE is adapted for self-learning of the AIQE.

Various embodiments are further described herein with reference to the accompanying figures. It should be noted that the description and figures relate to exemplary embodiments and should not be construed as a limitation to the subject matter of the present disclosure. It is also to be understood that various arrangements may be devised that, although not explicitly described or shown herein, embody the principles of the subject matter of the present disclosure. Moreover, all statements herein reciting principles, aspects, and embodiments of the subject matter of the present disclosure, as well as specific examples, are intended to encompass equivalents thereof. Yet further, for the sake of brevity, operation or working principles pertaining to the technical material that is known in the technical field of the present disclosure have not been described in detail so as not to unnecessarily obscure the present disclosure.

Figure 1:
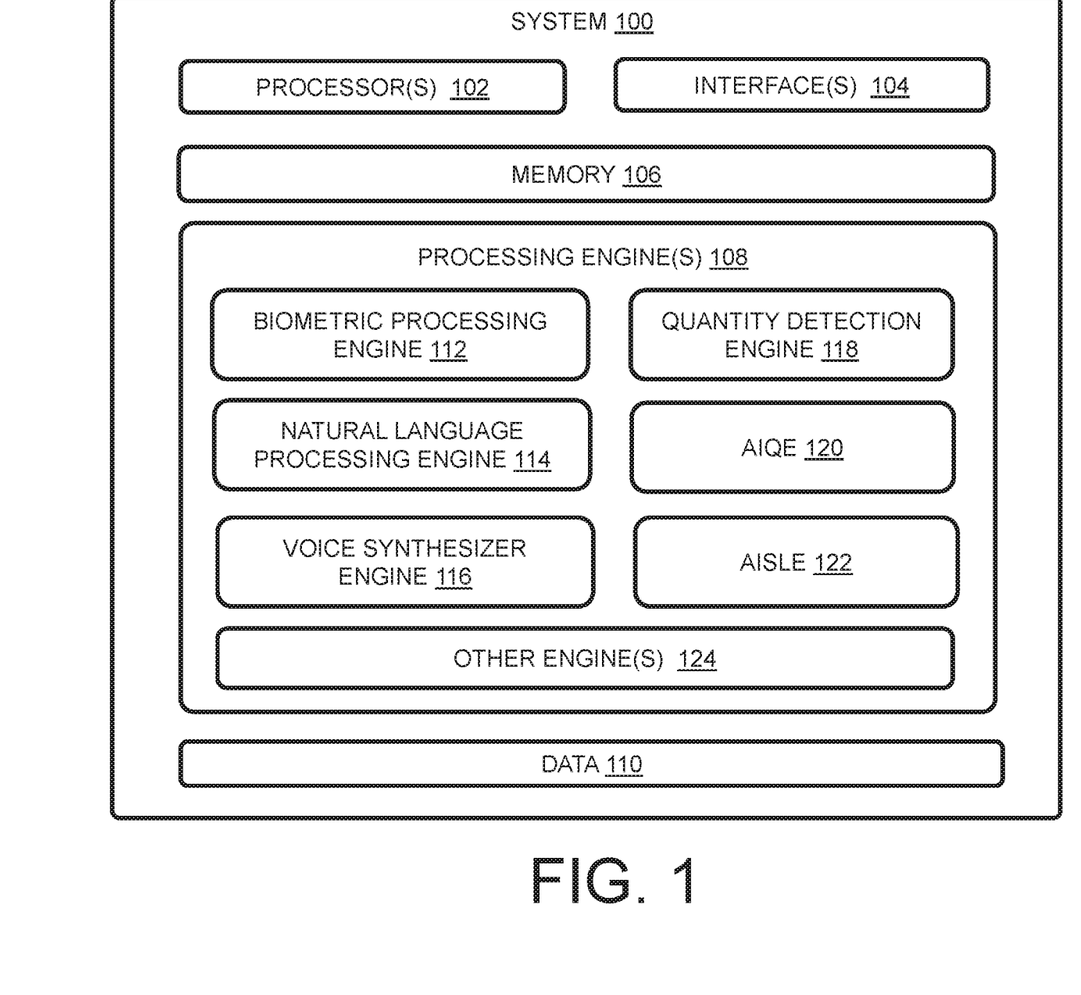
FIG. 1 illustrates various components of an exemplary warehouse management system in accordance with an exemplary embodiment of the present disclosure.

FIG. 1 illustrates exemplary functional components of a warehouse management system 100 in accordance with an embodiment of the present disclosure. In an aspect, the system 100 may be implemented as a cloud-based system and can be accessed by devices connected to the system though a communication network. The communication network may be a single network or a combination of multiple networks. The communication network may include one or more area networks, such as a local area network (LAN), a wide area network (WAN), an intranet, the internet, or any other type of network. In an example, the network may include a mobile communication network, for example, 2G, 3G, 4G, or 5G mobile communication network. The communication network may be coupled to one or more other networks, thereby providing coupling between a greater number of devices. Such can be the case, for example, when networks are coupled together via the Internet.

In an aspect, the system 100 includes a processor(s) 102, an interface(s) 104, and a memory 106.

The processor(s) 102 may be implemented as one or more microprocessors, microcomputers, microcontrollers, digital signal processors, logic circuitries, and/or any devices that manipulate data based on operational instructions. Among other capabilities, the one or more processor(s) 102 are configured to fetch and execute computer-readable instructions and one or more routines stored in the memory 106. The memory 106 may store one or more computer-readable instructions or routines, which may be fetched and executed to manage warehouse over a network service. The memory 106 may include any non-transitory storage device including, for example, volatile memory such as RAM, or non-volatile memory such as EPROM, flash memory, and the like.

The interface(s) 104 may include a variety of interfaces, for example, interfaces for data input and output devices referred to as I/O devices, storage devices, and the like. The interface(s) 104 may facilitate communication of the system 100 with various devices coupled to the system 100. The interface(s) 104 may also provide a communication pathway for one or more components of the system 100. Examples of such components include, but are not limited to, processing engine(s) 108 and data 110. The data 110 may include data that is either stored or generated as a result of functionalities implemented by any of the components of the processing engine(s) 108.

The processing engine(s) 108 may be implemented as a combination of hardware and programming (for example, programmable instructions) to implement one or more functionalities of the processing engine(s) 108. In examples described herein, such combinations of hardware and programming may be implemented in several different ways. For example, the programming for the processing engine(s) 108 may be processor executable instructions stored on a non-transitory machine-readable storage medium and the hardware for the processing engine(s) 108 may include a processing resource (for example, one or more processors), to execute such instructions. In the present examples, the machine-readable storage medium may store instructions that, when executed by the processing resource, implement the processing engine(s) 108. In such examples, the system 100 may include the machine-readable storage medium storing the instructions and the processing resource to execute the instructions or the machine-readable storage medium may be separate but accessible to the system 100 and the processing resource. In other examples, the processing engine(s) 108 may be implemented by electronic circuitry.

In an aspect, the processing engine(s) 108 may include a biometric processing engine 112, a natural language processing engine 114, a voice synthesizer engine 116, a quantity detection engine 118, an artificial image quantization engine (AIQE) 120, an artificial image self-learning engine (AISLE) 122, and other engine(s) 124. The other engine(s) 124 may implement functionalities that supplement applications or functions performed by the system 100 or the processing engine(s) 108.

In operation, when a user being an individual or a service provider interacts with a device having an application accessing the system 100, the system 100 activates its biometric processing engine 112 to authenticate that user though facial recognition of the user. The biometric processing engine 112 authenticates the user by continuously looking for faces in associated service provider's database (not shown in figures) until some relevant faces are found; extracting face templates, representing facial features, from all the found relevant faces; matching one by one the extracted face templates against the relevant faces from the associated service provider's database; and authenticating the user based on the matching.

However, in case no match is found, the biometric processing engine 112 again continuously look out for faces in associated service provider's database (not shown in figures) until some relevant faces are found, and then repeats the entire process of authenticating the user.

Once the user is authenticated based on his/her facial features, the natural language processing engine 114 enables touchless or voice-based interaction of the user with the system 100 and the voice synthesizer engine 116 executes voice interrogative prompts synthesized and responds to responses received from the user. For instance, the natural language processing engine 114 along with the voice synthesizer engine 116 performs the following flow which can be extended and customized based on requirement:

System Prompt 1: "Welcome [NAME] From [Company]?"
System Prompt 2: "Are you working today?"
System Prompt 3: "Are you [ACTION1 (for example: delivering, returning, or the like)] [ARTICLE NAME] today?"
System Prompt 4: "Please put the tray with [ARTICLE NAME] into the highlighted area."
System Prompt 5: "Ready for the picture?"

Once the article is placed in the highlighted area, the quantity detection engine 118 captures images of transaction articles and feeds them to the AIQE 120 as well as the AISLE 122, where the AIQE 120 is for extracting quantities from the captured images and the AISLE 122 is for self-learning of the AIQE.

Figure 2:
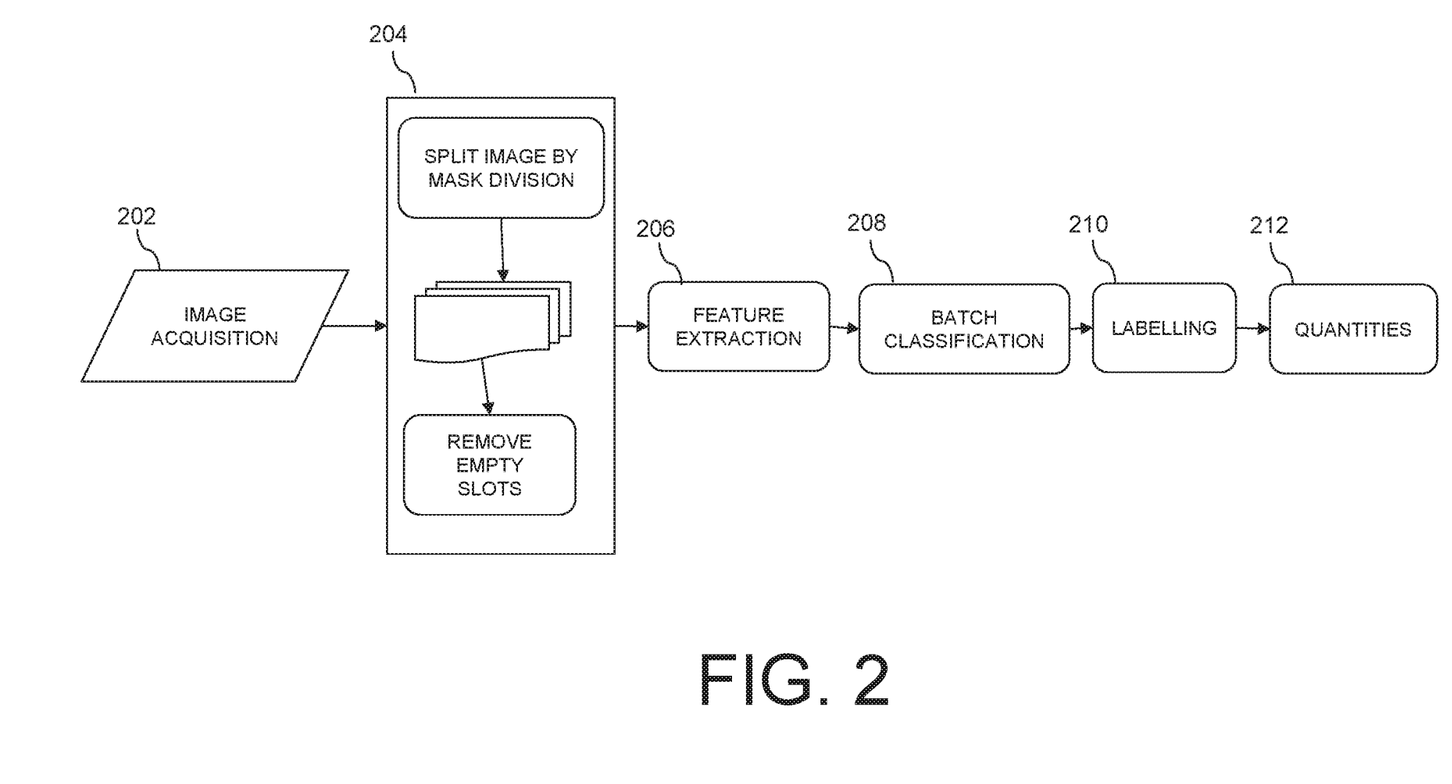
FIG. 2 illustrates a process flow of the artificial image quantization engine, in accordance with an exemplary embodiment of the present disclosure.

FIG. 2 illustrates a process flow of the AIQE 120, in accordance with an exemplary embodiment of the present disclosure.

In an aspect, once the images of transaction articles are feed to the AIQE 120, the AIQE 120 receives the captured images of the transaction articles from the quantity detection engine 118 (step 202). Then AIQE 120 performs composition classification by splitting the captured images by mask division so as to remove empty slots from the captured images (step 204). Following this, the AIQE 120 extracts key features including but not limited to a number of colors, type of colors, and spread of colors from the classified captured images (step 206) and performs batch classification of the transaction articles based on the extracted key features (step 208). Thereafter, the AIQE 120 performs labelling of the transaction articles based on the batch classification (step 210); and ascertain the quantity of the transaction articles based on the labelling of the transaction articles (212).

Figure 3:
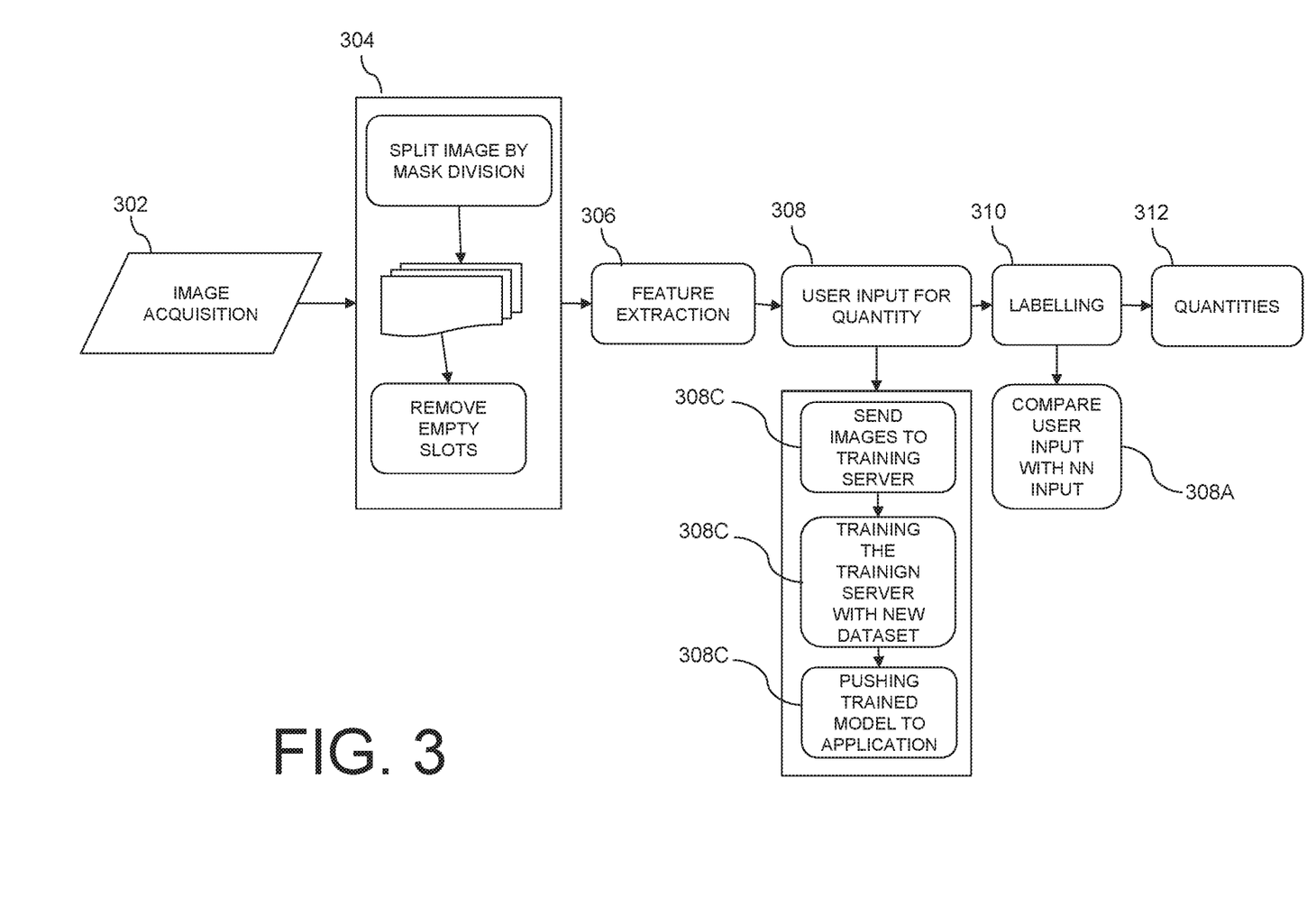
FIG. 3 illustrates a process flow of the artificial image self-learning engine, in accordance with an exemplary embodiment of the present disclosure.

FIG. 3 illustrates a process flow of the AISLE 122, in accordance with an exemplary embodiment of the present disclosure. As shown in FIG. 3, the AISLE 122 is adapted to receive the captured images of the transaction articles from the quantity detection engine 118 (step 302) and then performs composition classification by splitting the captured images by mask division to remove empty slots from the captured images (304). Then, the AISLE 122 extracts key features of the transaction articles from the classified captured images (step 306) and receives a user input related to quantity of the transaction articles (step 308). Thereafter, the AISLE 122 performs labelling of the transaction articles based on the user input (step 310); and ascertains the quantity of the transaction articles based on the labelling of the transaction articles (step 312).

In an aspect, based on receipt of the user-input related to the quantity of the transaction articles at step 308, the AISLE 122 retrains an available dataset with a training server (not shown in figures) coupled to the system 100 by sending the classified images to the training server (step 308A); training the training server with a new data set (step 308B); and pushing the trained model to e-receiver application associated with the system 100 (step 308C).

In an aspect, based on the labelling of the articles at step 310, the AISLE 122 compares the user-input related to the quantity of the transaction articles with the NN input for statistics (step 310A).

In yet another aspect, after the ascertainment of the quantity of the transaction articles at any of the steps 212 or 312, the system 100 is adapted to shipment image acquisition after ascertainment of the quantity of the transaction articles; and to publish the shipment image.

Figure 4:
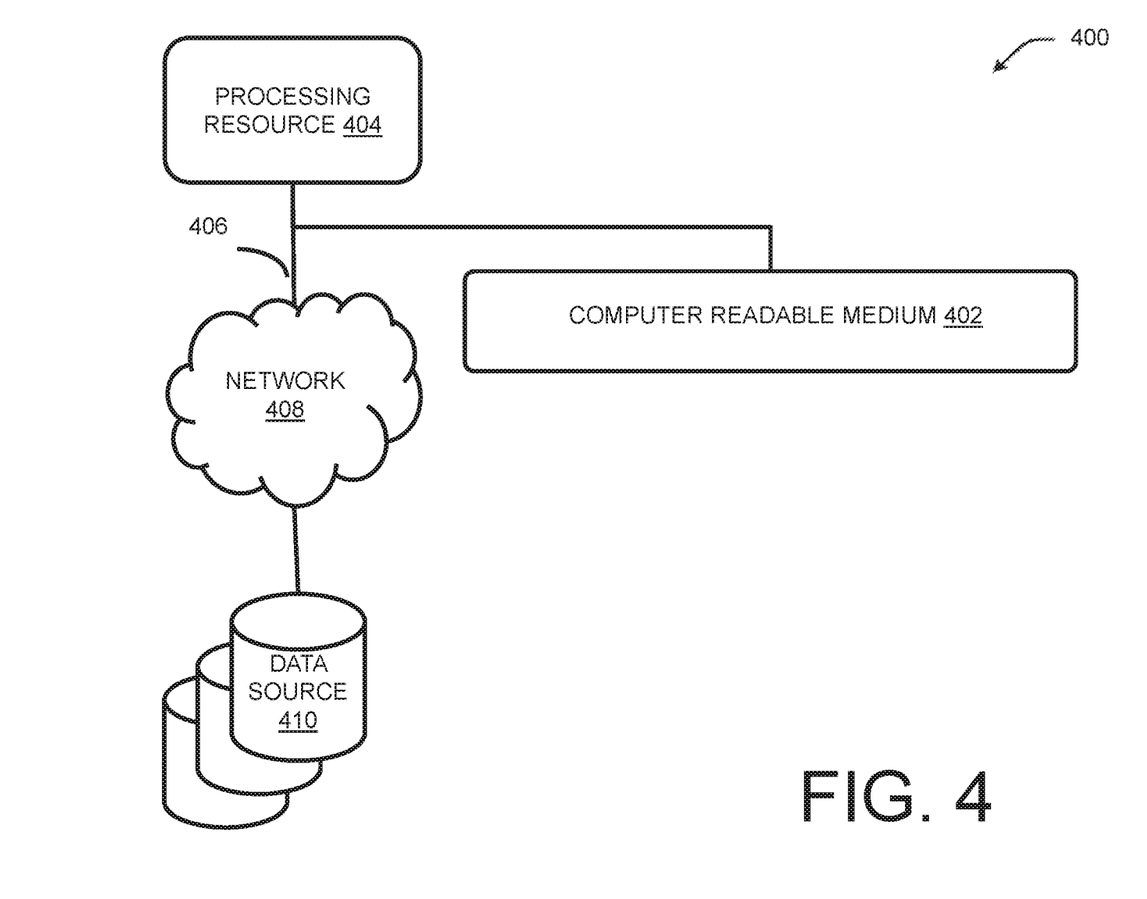
FIG. 4 illustrate a network environment for operating the system, in accordance with an exemplary embodiment of the present disclosure.

FIG. 4 illustrates an example network environment 400 using a non-transitory computer-readable medium 402 for performing operation of the system 100, according to an example of the present subject matter. The network environment 400 may be a public networking environment or a private networking environment. In one example, the network environment 400 includes a processing resource 404 communicatively coupled to the non-transitory computer readable medium 402 through a communication link 406.

For example, the processing resource 404 can be a processor. The non-transitory computer-readable medium 402 can be, for example, an internal memory device or an external memory device. In one example, the communication link 406 may be a direct communication link, such as one formed through a memory read/write interface. In another example, the communication link 406 may be an indirect communication link, such as one formed through a network interface. In such a case, the processing resource 404 can access the non-transitory computer readable medium 402 through a network 408. The network 408 may be a single network or a combination of multiple networks and may use a variety of communication protocols.

The processing resource 404 and the non-transitory computer readable medium 402 may also be communicatively coupled to data sources 410 over the network 408. The data sources 410 can include, for example, databases and computing devices. The data sources 410 may be used by the database administrators and other users to communicate with the processing resource 404.

In one example implementation, the non-transitory computer readable medium 402 includes a set of computer readable instructions. The set of computer readable instructions referred to as instructions hereinafter, can be accessed by the processing resource 404 through the communication link 406 and subsequently executed to perform acts for network service insertion. In other words, during operation, the processing resource 404 can executes the computer readable instructions to authenticate a user though facial recognition of the user; facilitate touchless interaction of the user with the system; execute voice interrogative prompts synthesized and respond to responses received from the user during interaction; and capture images of transaction articles and feed to an artificial image quantization engine (AIQE) and an artificial image self-learning engine (AISLE), wherein the AIQE is for extracting quantities from the captured images and the AISLE is for self-learning of the AIQE.

Figure 5:
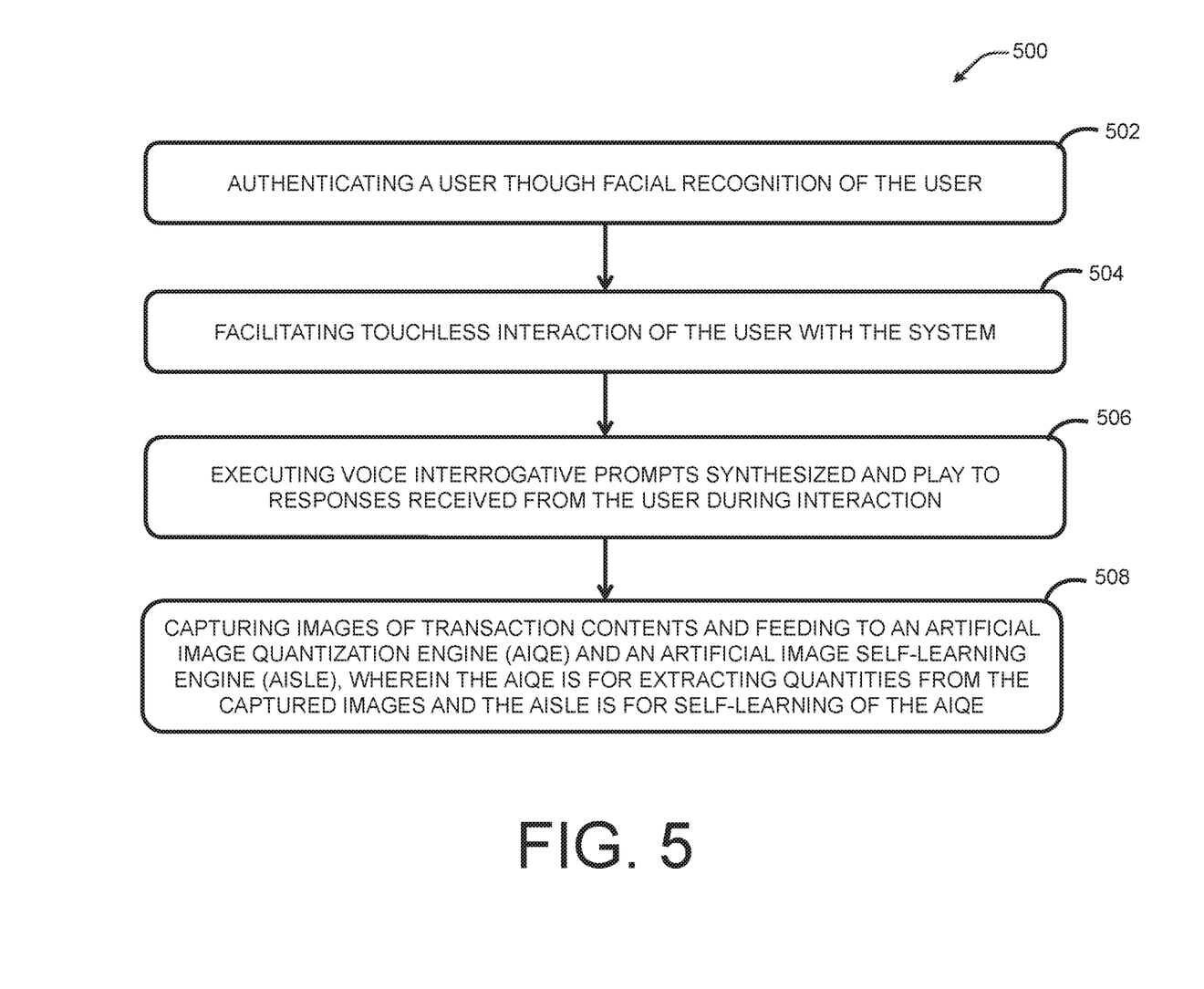
FIG. 5 illustrates a method for implementing the warehouse management system, in accordance with an exemplary embodiment of the present disclosure.

FIG. 5 illustrates a method 500 for operating the warehouse management system 100, according to an implementation of the present disclosure. The order in which the method 500 is described is not intended to be construed as a limitation, and any number of the described method blocks can be combined in any appropriate order to carry out the method 500 or an alternative method. Additionally, individual blocks may be deleted from the method 500 without departing from the scope of the subject matter described herein.

The method 500 can be performed by programmed computing devices, for example, based on instructions retrieved from the non-transitory computer-readable medium or non-transitory computer-readable media. The computer-readable media can include machine-executable or computer-executable instructions to perform all or portions of the described method. The computer readable media may be, for example, digital memories, magnetic storage media, such as magnetic disks and magnetic tapes, hard drives, or optically readable data storage media.

At block 502, the method 500 includes authenticating a user though facial recognition of the user. In an aspect, the authentication of the user is performed by a biometric processing engine by continuously looking for faces in associated database until some relevant faces are found; extracting the templates, representing facial features, from all the found relevant faces; matching the one by one the extracted templates against the relevant faces from the associated database; and authenticating the user based on the matching.

At block 504, the method 500 includes facilitating touchless interaction of the user with the system.

At block 506, the method 500 includes executing voice interrogative prompts synthesized and responding to responses received from the user during interaction.

At block 508, the method 500 includes capturing images of transaction articles and feeding to an artificial image quantization engine (AIQE) and an artificial image self-learning engine (AISLE), wherein the AIQE is for extracting quantities from the captured images and the AISLE is for self-learning of the AIQE.

In an aspect, the AIQE is adapted to receive the captured images of the transaction articles from the quantity detection engine; perform composition classification by splitting the captured images by mask division so as to remove empty slots from the captured images; extract key features of the transaction articles from the classified captured images; batch classification of the transaction articles based on the extracted key features; label of the transaction articles based on the batch classification; and ascertain the quantity of the transaction articles based on the labelling of the transaction articles.

In an aspect, the AISLE is adapted to receive the captured images of the transaction articles from the quantity detection engine; perform composition classification by splitting the captured images by mask division so as to remove empty slots from the captured images; extract key features of the transaction articles from the classified captured images; receive a user input related to quantity of the transaction articles; label the transaction articles based on the user input; and ascertain the quantity of the transaction articles based on the labelling of the transaction articles.

In an aspect, based on receipt of the user-input related to the quantity of the transaction articles, the AISLE is to retrain dataset available with a training server coupled to the system by sending the classified images to the training server; training the training server with a new data set; and pushing the trained model to e-receiver application associated with the system.

In an aspect, after the ascertainment of the quantity of the transaction articles, the system is adapted to shipment image acquisition after ascertainment of the quantity of the transaction articles; and to publish the shipment image.

Thus, with the implementation of the method 500 of the present subject matter, the flow of the warehouse management system 100 is completely automated and includes facial recognition for provider identification vocal commands recognition for our "NO TOUCH" user experience, grid projecting for scanning area limits and AI based self-learning product identification.

Also, the warehouse management system 100 is accessible by eReceiver applications installed on local devices to addresses the problem of stock management and check-in/check-out operations monitoring by creating an artificial image-based robot/application enabling the provider to do operations secure and autonomously.

The above description does not provide specific details of the manufacture or design of the various components. Those of skill in the art are familiar with such details, and unless departures from those techniques are set out, techniques, known, related art or later developed designs and materials should be employed. Those in the art can choose suitable manufacturing and design details.

Note that throughout the disclosure, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer-readable tangible, non-transitory medium or also referred to as a processor-readable medium. For example, a server can include one or more computers operating as a web server, database server, or another type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "receiving," or "authenticating," or "facilitating," or "executing," or "capturing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Further, the terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A warehouse management system comprising:
   a non-transitory storage device having embodied therein one or more routines operable to manage a warehouse check-in and check-out system; and
   one or more processors coupled to the non-transitory storage device and operable to execute the one or more routines, wherein the one or more routines include:
   a biometric processing engine, which when executed by the one or more processors, authenticates a user though facial recognition of the user;
   a natural language processing engine, which when executed by the one or more processors, enables touchless interaction of the user with the system;
   a voice synthesizer, which when executed by the one or more processors, executes synthesized voice interrogative prompts and responds to responses received from the user; and
   a quantity detection engine, which when executed by the one or more processors, captures images of transaction articles and feeds to an artificial image quantization engine (AIQE) and an artificial image self-learning engine (AISLE), wherein the AIQE is for extracting quantities from the captured images and the AISLE is for self-learning of the AIQE.

2. The system of claim 1, wherein the AIQE is configured to:
   receive the captured images of the transaction articles from the quantity detection engine;
   perform composition classification by splitting the captured images by mask division so as to remove empty slots from the captured images;
   extract key features of the transaction articles from classified captured images;
   batch classification of the transaction articles based on extracted key features;
   label the transaction articles based on the batch classification; and
   ascertain a quantity of the transaction articles based on the labelling of the transaction articles.

3. The system of claim 1, wherein the AISLE is configured to:
   receive the captured images of the transaction articles from the quantity detection engine;
   perform composition classification by splitting the captured images by mask division so as to remove empty slots from the captured images;
   extract key features of the transaction articles from classified captured images;
   receive a user input related to quantity of the transaction articles;
   label the transaction articles based on the user input; and
   ascertain a quantity of the transaction articles based on the labelling of the transaction articles.

4. The system of claim 3, wherein based on receipt of the user-input related to the quantity of the transaction articles, the AISLE is configured to retrain dataset available with a training server coupled to the system by:
   sending the classified captured images to the training server;

training the training server with a new data set; and
pushing trained model to an e-receiver application associated with the system.

5. The system of claim 1, wherein the biometric processing engine authenticates the user by:
continuously looking for faces in associated database until some relevant faces are found;
extracting templates, representing facial features, from all found relevant faces;
matching each extracted template against the relevant faces from the associated database; and
authenticating the user based on the matching.

6. The system of claim 2, wherein after ascertainment of the quantity of the transaction articles, the system is to:
acquire a shipment image after ascertainment of the quantity of the transaction articles; and
publish the shipment image.

7. A method for warehouse management, the method comprising
authenticating a user though facial recognition of the user;
facilitating touchless interaction of the user with the system;
executing synthesized voice interrogative prompts and responding responses received from the user during interaction; and
capturing images of transaction articles and feeding to an artificial image quantization engine (AIQE) and an artificial image self-learning engine (AISLE), wherein the AIQE is for extracting quantities from captured images and the AISLE is for self-learning of the AIQE.

8. The method of claim 7, wherein at the AIQE,
receiving the captured images of the transaction articles from a quantity detection engine;
performing composition classification by splitting the captured images by mask division so as to remove empty slots from the captured images;
extracting key features of the transaction articles from classified captured images;
batch classifying the transaction articles based on the extracted key features;
labelling of the transaction articles based on the batch classification; and
ascertaining a quantity of the transaction articles based on the labelling of the transaction articles.

9. The method of claim 7, wherein at the AISLE,
receiving the captured images of the transaction articles from a quantity detection engine;
performing composition classification by splitting the captured images by mask division so as to remove empty slots from the captured images;
extracting key features of the transaction articles from the classified captured images;
receiving a user input related to quantity of the transaction articles;
labelling the transaction articles based on the user input; and
ascertaining the quantity of the transaction articles based on the labelling of the transaction articles.

10. The method of claim 9, wherein based on receipt of the user-input related to the quantity of the transaction articles, retraining dataset available with a training server coupled to the system by:
sending the classified captured images to the training server;
training the training server with a new data set to update a trained model; and
pushing the trained model to an e-receiver application associated with the system.

11. The method of claim 7, wherein authenticating the user comprises:
continuously looking for faces in an associated database until one or more relevant faces are found;
extracting the templates, representing facial features, from all found relevant faces;
matching each extracted template against the relevant faces from the associated database; and
authenticating the user based on the matching.

12. The method of claim 8, wherein after ascertainment of the quantity of the transaction articles, the method comprising:
acquisitioning a shipment image after ascertainment of the quantity of the transaction articles; and
publishing the shipment image.

13. A non-transitory computer-readable medium comprising instructions executable by a processing resource to:
authenticate a user though facial recognition of the user;
facilitate touchless interaction of the user with the system;
execute synthesized voice interrogative prompts and respond to responses received from the user during interaction; and
capture images of transaction articles and feed to an artificial image quantization engine (AIQE) and an artificial image self-learning engine (AISLE), wherein the AIQE is for extracting quantities from the captured images and the AISLE is for self-learning of the AIQE.

14. The non-transitory computer-readable medium as claimed in claim 13 comprising instructions executable by the processing resource, at the AIQE, to:
receive captured images of the transaction articles from a quantity detection engine;
perform composition classification by splitting the captured images by mask division so as to remove empty slots from the captured images;
extract key features of the transaction articles from the classified captured images;
batch classification of the transaction articles based on the extracted key features;
label the transaction articles based on the batch classification; and
ascertain quantity of the transaction articles based on the labelling of the transaction articles.

15. The non-transitory computer-readable medium as claimed in claim 13 comprising instructions executable by the processing resource, at the AISLE, to:
receive captured images of the transaction articles from the quantity detection engine;
perform composition classification by splitting the captured images by mask division so as to remove empty slots from the captured images;
extract key features of the transaction articles from the classified captured images;
receive a user input related to quantity of the transaction articles;
label the transaction articles based on the use input; and
ascertain a quantity of the transaction articles based on the labelling of the transaction articles.

16. The non-transitory computer-readable medium as claimed in claim 15 comprising instructions executable by the processing resource to retrain an available dataset with a training server coupled to the system, based on receipt of the user-input related to the quantity of the transaction articles, by:

sending the classified captured images to the training server;
training the training server with a new data set to update a trained model; and
pushing the trained model to an e-receiver application associated with the system.

17. The non-transitory computer-readable medium as claimed in claim 13 comprising instructions executable by the processing resource to authenticate the user by:
continuously monitoring for faces in an associated database until some relevant faces are found;
extracting the templates, representing facial features, from all found relevant faces;
matching each extracted template against the relevant faces from the associated database; and
authenticating the user based on the matching.

18. The non-transitory computer-readable medium as claimed in claim 14 comprising instructions executable by the processing resource to:
acquire a shipment image after ascertainment of the quantity of the transaction articles; and
publish the shipment image.

\* \* \* \* \*